(12) United States Patent
Mulder et al.

(10) Patent No.: US 6,680,115 B2
(45) Date of Patent: Jan. 20, 2004

(54) GLASS FIBER MATS, LAMINATES REINFORCED WITH THE SAME AND METHODS FOR MAKING THE SAME

(75) Inventors: Roger E. Mulder, Groningen (NL); Charles W. Peterson, Bergen op Zoom (NL); Harri Dittmar, Battenberg (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 30 days.

(21) Appl. No.: 09/871,058

(22) Filed: May 31, 2001

(65) Prior Publication Data

US 2001/0033923 A1 Oct. 25, 2001

Related U.S. Application Data

(62) Division of application No. 09/235,534, filed on Jan. 22, 1999, now Pat. No. 6,268,047.

(51) Int. Cl.$^7$ ................................. B32B 3/26
(52) U.S. Cl. .................. 428/359; 428/394; 428/401; 428/392; 428/375; 428/378; 428/391; 428/175; 428/213; 428/218; 428/219; 428/220; 428/298.1
(58) Field of Search ................ 428/401, 394, 428/392, 107, 375, 378, 391, 175, 213, 220, 219, 156, 359, 298.1

(56) References Cited

U.S. PATENT DOCUMENTS

| 3,044,146 A | 7/1962 | Thomas et al. ............ 28/78 |
| 3,614,936 A | 10/1971 | Philipps ................ 112/420 |

(List continued on next page.)

FOREIGN PATENT DOCUMENTS

| DE | 3321006 | 12/1984 |
| DE | 3535272 | 4/1995 |
| DE | 4442858 | 6/1996 |
| EP | 0 445 507 | 9/1991 |
| JP | 6-248550 | 9/1994 |
| WO | WO97/04946 | 2/1997 |
| WO | WO98/53978 | 12/1998 |

OTHER PUBLICATIONS

*The Manufacturing Technology of Glass Fibres*, by K. L. Loewenstein (3rd Ed 1993) pp. 30–44, 47–60, 115–122 and 126–135.

(List continued on next page.)

*Primary Examiner*—Merrick Dixon
(74) *Attorney, Agent, or Firm*—Andrew C. Siminerio (57) ABSTRACT

The present invention provides a mat having at least one primary area and at least one secondary area and adapted to reinforce a polymeric matrix material, the mat comprising (a) a first layer comprising a plurality of generally parallel, essentially continuous glass fiber strands oriented generally parallel to a longitudinal axis of the mat, at least a portion of outer surfaces of the first layer glass fiber strands having applied thereon at least a partial layer comprising at least a partially dried residue of first coating composition which is compatible with a polymeric matrix material, wherein at least a first portion of the first layer glass fiber strands are positioned within the at least one primary area at a primary strand density and at least a second portion of the first layer glass fiber strands are positioned within the at least one secondary area at a secondary strand density which is different from the primary strand density; and (b) a second layer comprising a plurality of randomly oriented glass fiber strands positioned within the at least one primary area and the at least one secondary area and adjacent to a surface of the first layer, at least a portion of outer surfaces of the second layer glass fiber strands having applied thereon at least a partial layer comprising at least a partially dried residue of a second coating composition which is compatible with the polymeric matrix material, wherein the first and second layers are joined to hold the mat together.

26 Claims, 5 Drawing Sheets

U.S. PATENT DOCUMENTS

| | | | |
|---|---|---|---|
| 3,664,909 A | 5/1972 | Ackley | 161/141 |
| 3,713,962 A | 1/1973 | Ackley | 161/154 |
| 3,850,723 A | 11/1974 | Ackley | 156/180 |
| 4,277,531 A | 7/1981 | Picone | 428/228 |
| 4,335,176 A | 6/1982 | Baumann | 428/228 |
| 4,692,375 A | 9/1987 | Neubauer et al. | 428/299 |
| 4,749,613 A | 6/1988 | Yamada et al. | 428/286 |
| 4,931,358 A | 6/1990 | Wahl et al. | 428/285 |
| 4,948,661 A | 8/1990 | Smith et al. | 428/286 |
| 5,011,737 A | 4/1991 | Smith et al. | 428/409 |
| 5,071,608 A | 12/1991 | Smith et al. | 264/119 |
| 5,108,678 A | 4/1992 | Hirasaka et al. | 264/113 |
| 5,129,131 A | 7/1992 | Kimura et al. | 28/107 |
| 5,194,462 A | 3/1993 | Hirasaka et al. | 524/13 |
| 5,344,687 A | 9/1994 | Grimnes et al. | 428/102 |
| 5,437,928 A | 8/1995 | Thimons et al. | 428/391 |
| 5,441,590 A | 8/1995 | Ihm et al. | 156/148 |
| 5,540,986 A | 7/1996 | Kimura et al. | 428/285 |
| 5,569,344 A | 10/1996 | Grimnes et al. | 156/90 |
| 5,883,023 A | 3/1999 | Martine et al. | 442/331 |
| 5,910,458 A | 6/1999 | Beer et al. | 442/367 |

OTHER PUBLICATIONS

*The Manufacturing Technology of Glass Fibres*, by K. L. Loewenstein (3rd Ed 1993) pp. 25 and 27.

*The Manufacturing Technology of Glass Fibres*, by K. L. Loewenstein (3rd Ed 1993) pp. 293–303.

*Essentials of Textiles*, by M. L. Joseph, (3rd Ed.), pp. 224–234.

*The Manufacturing Technology of Glass Fibres*, by K. L. Loewenstein (3rd Ed 1993) pp. 237–291.

*The Manufacturing Technology of Glass Fibres*, by K. L. Loewenstein (3rd Ed 1993) pp. 219–222.

*The Manufacturing Technology of Glass Fibres*, by K. L. Loewenstein (3rd Ed 1993) pp. 165–172.

*The Manufacturing Technology of Glass Fibres*, by K. L. Loewenstein (3rd Ed 1993) pp. 309–311 and 315.

*Encyclopedia of Polymer Science and Technology*, vol. 6 (1967), pp. 505–712.

GLASS FIBER MATS, LAMINATES REINFORCED WITH THE SAME AND METHODS FOR MAKING THE SAME

This invention is a divisional of application Ser. No. 09/235,534, filed Jan. 22, 1999 now U.S. Pat. No. 6,268,047.

BACKGROUND OF THE INVENTION

1. Field of the Invention

This invention relates generally to glass fiber mats, polymeric laminates reinforced with the same, and in particular thermoplastic laminates and methods for making the same.

2. Technical Considerations and Prior Art

An increasingly popular process for forming composites is by compression molding or stamping a moldable sheet of a thermoplastic resin reinforced with fibers such as a glass fiber mat, often referred to as glass mat thermoplastics or "GMT". These composite sheets can be used to form articles such as automobile components and housings for computers.

An example of a commercially successful GMT sheet is the AZDEL® moldable composite sheet which is formed by extruding layers of polypropylene resin sheet with needled mats of continuous glass fiber strand. The AZDEL® composite sheet is commercially available from Azdel, Inc. of Shelby, N.C.

U.S. Pat. No. 3,044,146 discloses a fibrous glass reinforcing mat which utilizes a limited quantity of continuous glass strands to maintain major components of weakly bonded fibrous glass material in evenly distributed, more integrated form. The unwoven fibrous bodies are tied together by continuous strands of glass fibers and interconnect through the bodies at regularly spaced intervals.

U.S. Pat. No. 3,614,936 discloses a nonwoven structure of chopped glass strand which is stitched together. Optionally, the nonwoven structure can include parallel glass strands lengthwise of the structure. The stitched nonwoven structure can be compacted with heated rollers to fuse the stitching thread and then needled.

U.S. Pat. Nos. 3,664,909; 3,713,962 and 3,850,723 disclose fibrous mats of unstranded filaments which can be layered with reinforcing mats of fiber strands.

U.S. Pat. No. 4,749,613 discloses a thermoplastic stampable sheet composed of 30 to 80 percent by weight reinforcing fibers arranged in one direction, needled together with a swirled continuous strand mat, the sheet being impregnated with a thermoplastic resin.

U.S. Pat. No. 4,931,358 discloses a material consisting of a thermoplastic polymer and a needled textile fabric consisting of at least two layers of continuous filament yarn oriented in at least one preferred direction and at least one layer of unoriented fibers.

U.S. Pat. Nos. 4,948,661; 5,011,737; 5,071,608 and 5,098,624 disclose fiber reinforced thermoplastic molded products produced by intimately blending reinforcing glass fibers and thermoplastic fibers into a web and heating the web to the melting point of the thermoplastic fibers while applying pressure to the web to press the web into a consolidated structure.

U.S. Pat. Nos. 5,108,678 and 5,194,462 disclose a fiber reinforced plastic sheet having a gradient layer structure wherein less opened strands are concentrated in the lower layers and more opened strands are concentrated in the upper layers of the structure.

U.S. Pat. Nos. 5,129,131 and 5,540,986 disclose a stampable sheet of thermoplastic resin reinforced with a glass fiber mat having a layer of non-oriented fibers and a layer of unidirectional fibers which are mechanically intertwined.

There is a long-felt need in the industry for a mat for applications such as GMT which can be readily impregnated by the thermoplastic matrix material, which has good uniformity of glass distribution and flow into complex mold shapes and which provides a composite having mechanical properties, such as strength and stiffness and good surface smoothness throughout its entire surface. However, the inability to thoroughly impregnate the mat with resin, especially unidirectional continuous strand along the longitudinal edge of the mat, results in poor surface finish in laminates incorporating the mat. This in turn detracts from the aesthetics of a molded product fabricated from the laminate.

It would be advantageous to provide a mat for applications such as GMT and other molding processes which provides a consistently high quality finish over the entire surface of laminates and products incorporating the mat.

SUMMARY OF THE INVENTION

The present invention provides a mat having at least one primary area and at least one secondary area and adapted to reinforce a polymeric matrix material, the mat comprising (a) a first layer comprising a plurality of generally parallel, essentially continuous glass fiber strands oriented generally parallel to a longitudinal axis of the mat, at least a portion of outer surfaces of the first layer glass fiber strands having applied thereon at least a partial layer comprising at least a partially dried residue of first coating composition which is compatible with a polymeric matrix material, wherein at least a first portion of the first layer glass fiber strands are positioned within the at least one primary area at a primary strand density and at least a second portion of the first layer glass fiber strands are positioned within the at least one secondary area at a secondary strand density which is different from the primary strand density; and (b) a second layer comprising a plurality of randomly oriented glass fiber strands positioned within the at least one primary area and the at least one secondary area and adjacent to a surface of the first layer, at least a portion of outer surfaces of the second layer glass fiber strands having applied thereon at least a partial layer comprising at least a partially dried residue of a second coating composition which is compatible with the polymeric matrix material, wherein the first and second layers are joined to hold the mat together.

Another aspect of the present invention is a reinforced polymeric laminate comprising a polymeric matrix material and the reinforcing mat described above.

Yet another aspect of the present invention is a reinforced polymeric composite comprising at least one laminate comprising a polymeric matrix material and the reinforcing mat described above.

Another aspect of the present invention is a method for making a mat adapted to reinforce a polymeric matrix material, the method comprising the steps of (a) positioning a plurality of generally parallel, essentially continuous glass fiber strands oriented generally parallel to a longitudinal axis of the mat to form a first layer, at least a portion of outer surfaces of the first layer glass fiber strands having applied thereon at least a partial layer comprising at least a partially dried residue of a first coating composition which is compatible with a polymeric matrix material, wherein at least a first portion of the first layer glass fiber strands are positioned within an at least one primary area at a primary strand density and at least a second portion of the first layer glass fiber strands are positioned within an at least one secondary area at a secondary strand density which is different from the primary strand density; (b) dispersing a plurality of randomly oriented glass fiber strands within the at least one primary area and the at least one secondary area and adjacent to a surface of the first layer to form a second layer, at least a portion of outer surfaces of the second layer glass fiber strands having applied thereon at least a partial layer comprising at least a partially dried residue of a second coating composition which is compatible with the polymeric matrix material; and (c) joining the first and second layers to hold the mat together.

Still another aspect of the present invention is a method for reinforcing a polymeric matrix material to form a reinforced laminate, the method comprising the steps of making a mat in a manner as described above, coating and impregnating at least a portion of the mat with the polymeric matrix material and at least partially curing the polymeric matrix material to form a reinforced laminate.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

The mat of the present invention provides numerous advantages in composite forming processes such as GMT, including but not limited to good permeability for impregnation by thermoplastic matrix material, good uniformity of glass distribution and flow into complex mold shapes and good surface quality throughout the surface of laminates and composites incorporating the mat, and mechanical properties, such as tensile, flexural and compressive strength, tensile and flexural modulus and stiffness.

Figure 1:
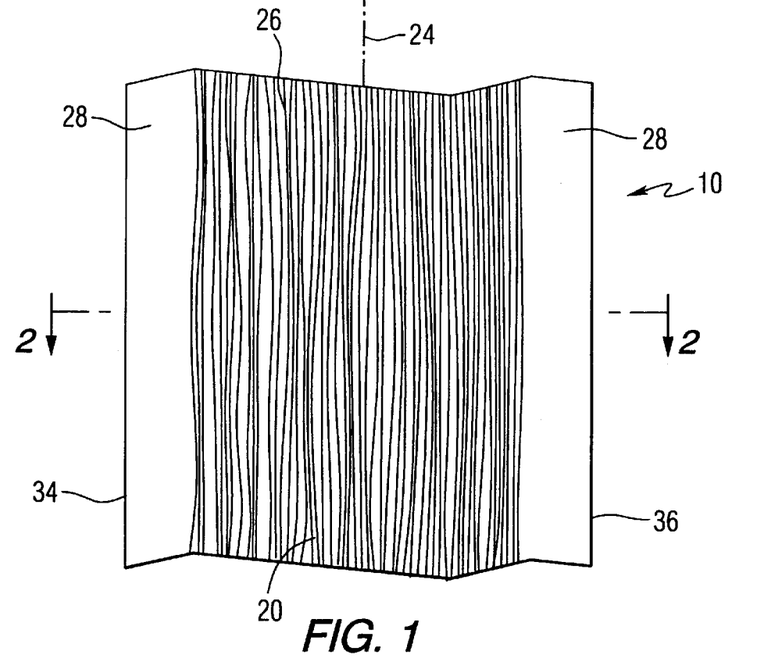
FIG. 1 is an enlarged plan view of a portion of a reinforcing mat, incorporating features of the present invention.
Figure 2:
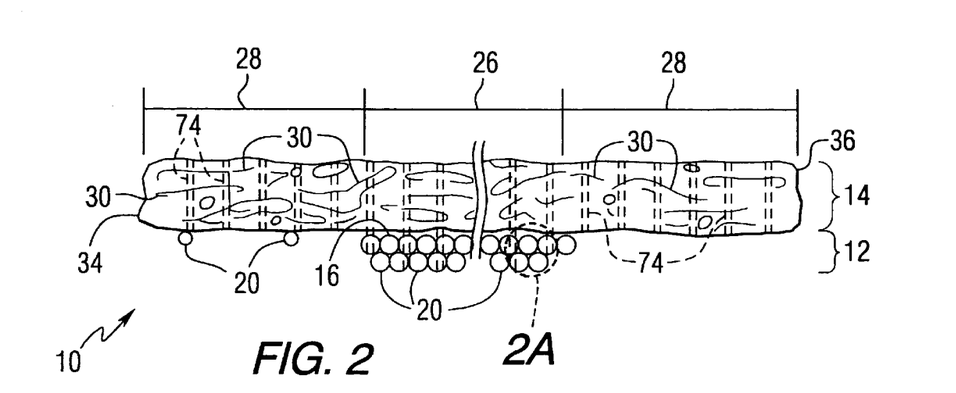
FIG. 2 is an enlarged cross sectional view of the mat of FIG. 1, taken along lines 2—2 of FIG. 1.

Referring to the drawings, wherein like numerals indicate like elements throughout, there is shown in FIGS. 1 and 2 an embodiment of a mat, generally designated 10, in accordance with the present invention. The mat 10 comprises a first layer 12 and second layer 14 positioned adjacent to a surface 16 of layer 12. If required, a third intermediate layer 18 (shown in FIG. 3), can be included between first and second layers 12 and 14, as will be discussed later in more detail.

Figure 2A:
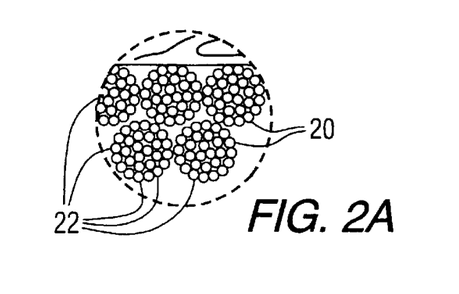
FIG. 2A is an enlarged end view of the continuous, unidirectional strands incorporated into the mat of the present invention.

The layer 12 comprises a plurality of unidirectional, generally parallel essentially continuous strands 20 of glass fibers 22 (see FIG. 2A). As used herein, the term "fibers" means a plurality of individual filaments. The term "strand" as used herein means a multiplicity of fibers grouped together. The term "roving" as used herein means a multiplicity of strands grouped together. The phrase "essentially continuous" as used herein means that the glass fiber strands 20 can have an average length of about 10 meters to about 400 kilometers (km), and preferably have a mean average length of about 500 to about 1500 meters. The phrase "unidirectional" as used herein means that the glass fiber strands 20 of the layer 12 are oriented generally parallel to a longitudinal axis 24 of the mat (shown in FIG. 1). The phrase "generally parallel to a longitudinal axis 24 of the mat" as used herein means that the glass fiber strands 20 are oriented at an angle of less than about 25 degrees with respect to the longitudinal axis 24 of the mat 10. Preferably the glass fiber strands 20 are oriented at an angle of less than about 10 degrees with respect to the longitudinal axis 24 of the mat 10 and, more preferably, the glass fiber strands 20 are parallel to the longitudinal axis 24 of the mat 10, as shown in FIG. 1.

Orienting the glass fiber strands 20 of the layer 12 of the mat 10 generally parallel to the longitudinal axis 24 of the mat 10 provides good mechanical strength in the direction of the strand orientation to a composite reinforced with the mat, which is advantageous for structures such as automotive bumper beams in which highly directionalized strength and stiffness is desired.

With continued reference to FIGS. 1 and 2, the number and positioning of the strands 20 in the first layer 12 varies. More specifically, in primary areas 26 of the mat 10, there are about 1.5 to about 6 strands per centimeter of width, and preferably about 2 to about 5 strands per centimeter (hereinafter "primary strand density"). In secondary areas 28 of the mat 10, there is no greater than about 0.15 strands per centimeter of mat width, and preferably no greater than about 0.05 strands per centimeter (hereinafter "secondary strand density"). In the most preferred embodiment of the invention there are no strands 20 in the secondary area 28 of the mat, as shown in the right-hand section of FIG. 2. The actual spacing between strands 20 within the primary and secondary areas depends on their respective strand density. Depending on the strand density, the strands 20 can be spaced from adjacent strands, in direct contact with adjacent strands or can overlay one or more adjacent strands, for example as shown in FIG. 2A.

It should be appreciated that although FIGS. 1 and 2 illustrate an embodiment of the invention that includes a single primary area 26 and two secondary areas 28, mats of the present invention can include additional primary and secondary areas, as will be discussed later.

The second layer 14, which extends the entire width of the mat 10, comprises a plurality of randomly oriented, continuous glass fiber strands 30. The extent to which layer 12 is overlaid by layer 14 and supports layer 14 during fabrication of the mat (as will be discussed later) varies over the width of the mat. More specifically, at the primary areas 26 of the mat 10, layer 14 overlays and is supported by the strands 20 positioned within the primary area 26 at the primary strand density. Within the secondary areas 28 of the mat 10, since the secondary strand density is at least an order of magnitude smaller than the primary strand density, strands 20 within the secondary areas 28 provide little support for layer 14 as compared to the strands 20 within the primary areas 26. In the embodiment of the invention where there are no strands 20 within the secondary areas 28, there is no strand support for layer 14.

As will be discussed later, depending on the width of the secondary areas 28 and the length of the glass fiber strands in the second layer 14, it may be necessary to incorporate third layer 18 into the mat 10 to support the second layer 14 within the secondary areas 28.

As an alternative to forming the second layer 14 from generally continuous glass fiber strands 30, as discussed above and shown in FIGS. 1 and 2, the second layer 14 can be formed from randomly oriented, chopped glass fiber strands. More specifically, referring to FIG. 3, second layer 114 of mat 110 is formed from randomly oriented, chopped glass fiber strands 130. In another alternative embodiment shown in FIG. 4, second layer 214 of mat 210 is a mixture of randomly oriented continuous glass fiber strands 230 and chopped glass fiber strands 231. In yet another alternative embodiment of the present invention, the second layer comprises alternating layers of randomly oriented continuous glass fiber strands and chopped glass fiber strands. In these latter two alternative embodiments, the randomly oriented continuous glass fiber strands can comprise about 1 to about 99 weight percent, and preferably about 1 to about 50 weight percent of the second layer of the mats on a total solids basis, with the balance being randomly oriented chopped glass fiber strands.

The length of the continuous glass fiber strands 30 shown in FIG. 2 can be the same as those discussed in detail above for the strands 20 of layer 12. The chopped fiber strands 130 shown in FIG. 3 preferably have a average length ranging from about 10 to about 150 millimeters (about 0.5 to about 6 inches), and more preferably about 25 to about 100 millimeters (about 1 to about 4 inches).

Figure 3:
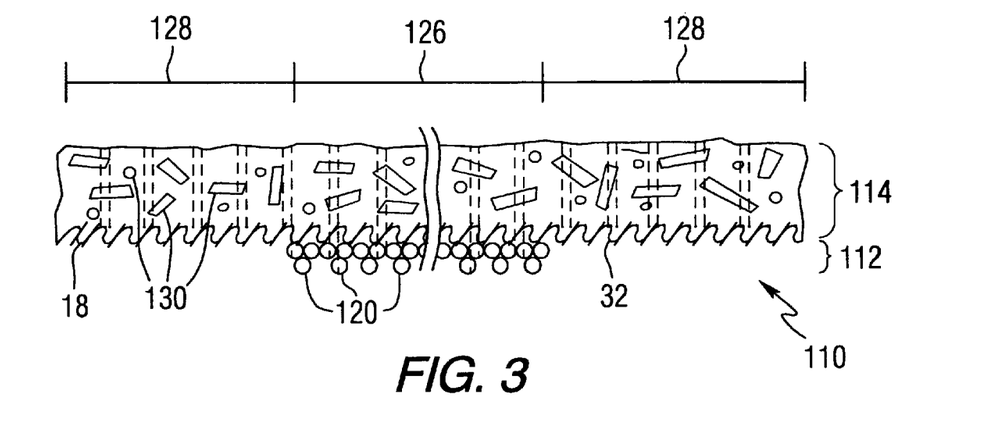
FIGS. 3 and 4 are views similar to FIG. 2 of alternative embodiments of a mat incorporating features of the present invention.
Figure 4:
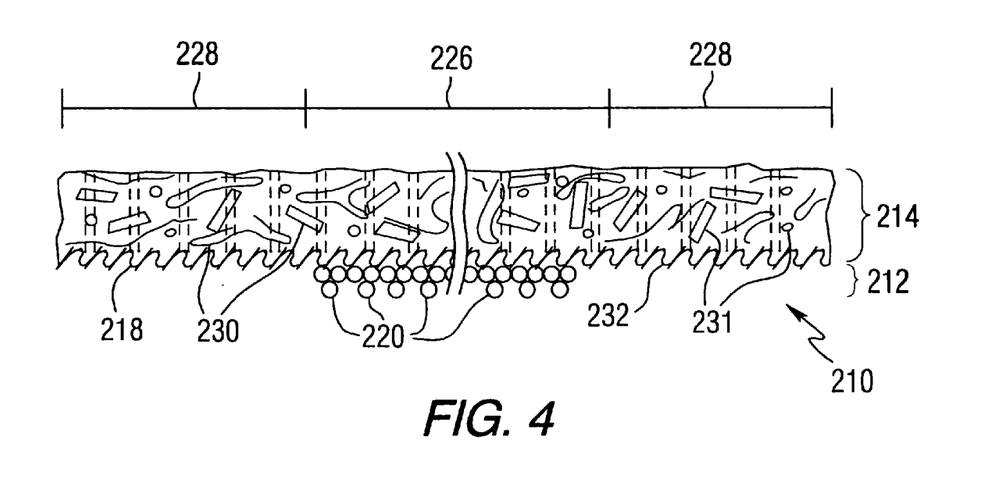

Referring to FIG. 3, in this embodiment of the invention, the second layer 114 is formed from randomly oriented, chopped glass fiber strands 130. A third layer 18 is incorporated into the mat 110 to help support the chopped strands within secondary areas 128. More specifically, the mat 110 further comprises one or more fabrics 32 which extend across the width of the mat 110, overlaying the strands 120 in the primary areas 126 and extending over the secondary areas 128. Similarly, in the embodiment of the invention illustrated in FIG. 4 where second layer 214 includes both continuous fiber strands 230 and chopped fiber strands 231, a third layer 218 can be incorporated into the mat to help support the chopped strands 231. More specifically, a fabric 232 can be positioned to extend across the width of the mat 210, overlaying the strands 220 in the primary areas 226 and extending over the secondary areas 228. The fabrics 32 and 232 can be formed from glass fibers, thermoplastic fibers, thermosetting fibers, other thermoplastic compatible materials such as are discussed below, and/or combinations thereof, and can be formed as a nonwoven or woven material. Non-limiting examples of a suitable nonwoven material includes is a material formed from a slurry of discontinuous or non-continuous fibers, felts and papers. Suitable woven materials include those formed by weaving or knitting. For more information regarding felts and non-woven fabrics, see M. L. Joseph, *Essentials of Textiles*, (3d Ed.) at pages 224–234, which is hereby incorporated by reference.

Layers 12 and 14 of the mat 10 comprise a class of glass fibers generally accepted to be based upon oxide compositions such as silicates selectively modified with other oxide and non-oxide compositions. Useful glass fibers can be formed from any type of fiberizable glass composition known to those skilled in the art, and include those prepared from fiberizable glass compositions such as "E-glass", "A-glass", "C-glass", "D-glass", "R-glass", "S-glass", and E-glass derivatives. As used herein, "E-glass derivatives" means glass compositions which include minor amounts of fluorine and/or boron and preferably are fluorine-free and/or boron-free. Furthermore, as used herein, "minor" means less than about 1 weight percent fluorine and less than about 5 weight percent boron. Such compositions and methods of making glass filaments therefrom are well known to those skilled in the art and further discussion thereof is not believed to be necessary in view of the present disclosure. As used herein, the term "fiberizable" means a material capable of being formed into a generally continuous filament, fiber or strand. If additional information is needed, such glass compositions and fiberization methods are disclosed in K. Loewenstein, *The Manufacturing Technology of Continuous Glass Fibres*, (3d Ed. 1993) at pages 30–44, 47–60, 115–122 and 126–135, which are hereby incorporated by reference.

The glass fibers 22 can have a nominal filament diameter ranging from about 5.0 to about 35.0 micrometers (corresponding to a filament designation of D through U and above), and preferably have a nominal filament diameter ranging from about 9.0 to about 30.0 micrometers. For further information regarding nominal filament diameters and designations of glass fibers, see Loewenstein at page 25, which is hereby incorporated by reference.

The number of fibers per strand in the first layers 12, 112 and 212 and second layers 14, 114 and 214 of mats 10, 110 and 210 can range from about 100 to about 15,000, and is preferably about 200 to about 7000. For more information regarding glass fiber strand designations, see Loewenstein at page 27, which is hereby incorporated by reference.

The following discussion is directed toward the glass fibers used in the embodiment of the invention illustrated in FIGS. 1 and 2 and discussed above, but it should be appreciated that the discussion applies to all embodiments of the invention.

Referring now to FIG. 1, the glass fiber strands 20 and 30 are coated on at least a portion of their outer surfaces with at least a partial layer comprising at least a partially dried residue of a coating composition which is compatible with a thermoplastic matrix material (discussed in detail below). As used herein, the phrase "compatible with the thermoplastic matrix material" means that the components of the coating composition facilitate wet-through and wet-out of the matrix material upon the fibers forming strands 20 and 30 and provide adequate physical properties in the composite. The measure of the penetration of the matrix material through the mat is referred to as "wet-through". The measure of the flowability of the matrix material through the glass fiber mass to obtain essentially complete encapsulation of the entire surface of each glass fiber by the matrix material is referred to as "wet-out".

Suitable coating compositions include sizing compositions and/or secondary coating compositions As used herein, the terms "size", "sized" or "sizing" refer to the aqueous composition applied to the fibers immediately after formation of the glass fibers. The term "secondary coating" refers to a coating composition applied secondarily to one or a plurality of strands after the sizing composition is applied, and preferably at least partially dried.

Suitable sizing compositions useful herein preferably comprise one or more polymeric film forming materials which are compatible with the thermoplastic matrix material. Non-limiting examples of suitable film-forming materials for use in the present invention include thermoplastic materials, thermosetting materials and mixtures thereof.

The sizing compositions preferably also comprise one or more glass fiber lubricants which are chemically different from the polymeric film-forming materials discussed above. Useful glass fiber lubricants include cationic, non-ionic or anionic lubricants and mixtures thereof.

The sizing compositions preferably also comprise one or more coupling agents. Examples of suitable coupling agents include epoxy, glycidoxy, mercapto, cyano, allyl, alkyl, urethano, halo, isocyanato, ureido, imidazolinyl, vinyl, acrylato, methacrylato, amino or polyamino group containing materials. Non-limiting examples of suitable coupling agents include A-187 gamma-glycidoxypropyltrimethoxysilane (preferred), A-174 gamma-methacryloxypropyltrimethoxysilane and A-1100 gamma-aminopropyltriethoxysilane silane coupling agents, each of which are commercially available from OSi Specialties, Inc. of Tarrytown, N.Y.

Crosslinking materials can also be included in the sizing compositions. Non-limiting examples of suitable crosslinkers include melamine formaldehyde and blocked isocyanates.

The sizing compositions can comprise one or more emulsifying agents for emulsifying components of the sizing composition. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

The sizing compositions can also include one or more aqueous dispersible or soluble plasticizers to improve flexibility. Examples of suitable non-aqueous-based plasticizers which are aqueous dispersible plasticizers include phthalates, trimellitates and adipates.

Fungicides, bactericides and anti-foaming materials and organic and/or inorganic acids or bases in an amount sufficient to provide the aqueous sizing composition with a pH of about 2 to about 10 can also be included in the sizing composition.

Water (preferably deionized) is included in the sizing composition in an amount sufficient to facilitate application of a generally uniform coating upon the strand.

The sizing compositions can also include other materials well known to those skilled in the art.

Further discussion of the sizing compositions is not felt to be necessary. Non-liming examples of thermoplastic compatible sizing compositions are disclosed in U.S. Pat. No. 5,437,928 and U.S. Ser. No. 08/828,212 at page 8, line 4 through page 13, line 10, which are hereby incorporated by reference. Additional information and further non-limiting examples of other suitable sizing compositions are set forth in Loewenstein at pages 237–291, which is hereby incorporated by reference.

The sizing compositions applied to the glass fibers of the first and second layers 12 and 14 may be the same or different.

The sizing composition can be applied in many ways well known to those skilled in the art, for example by contacting the fibers with a static or dynamic applicator, such as a roller or belt applicator, spraying or other means. For a discussion of suitable applicators, see Loewenstein at pages 165–172, which is hereby incorporated by reference.

The sized fibers are dried at room temperature or at elevated temperatures to remove excess moisture from the fibers and cure any curable sizing or secondary coating composition components. Drying of glass fiber forming packages or cakes is discussed in detail in Loewenstein at pages 219–222, which is hereby incorporated by reference. For example, a forming package can be dried in an oven at a temperature of about 104° C. (220° F.) to about 160° C. (320° F.) for about 10 to about 24 hours to produce glass fiber strands having an at least partially dried residue of the coating composition thereon. The temperature and time for drying the glass fibers will depend upon such variables as the percentage of solids in the sizing composition, components of the sizing composition, type of glass fiber, and moisture content. The sizing composition is preferably present on the fiber in an amount ranging from about 0.3 percent to about 1.5 percent by weight after drying, measured by loss on ignition.

Alternatively, the coating composition can be an impregnating or secondary coating having components such as are discussed above which are applied to at least a portion of the surface of the strands in an amount effective to coat or impregnate the portion of the strands. The secondary coating can be conventionally applied by methods well known in the art, for example by dipping the strand in a bath containing the composition, by spraying the composition upon the strand or by contacting the strand with a static or dynamic applicator such as a roller or belt applicator. The coated strand can be passed through a die to remove excess coating from the strand and/or dried, as discussed above, for a time sufficient to at least partially dry and/or cure the secondary coating.

In an alternative embodiment of the invention, in addition to the glass fibers in layers 12 and 14, the layers can further comprise fibers or strands of materials other than glass fibers ("non-glass fibers"). Suitable non-glass fibers believed to be useful in the present invention are discussed at length in the *Encyclopedia of Polymer Science and Technology*, Vol. 6 (1967) at pages 505–712, and U.S. Ser. No. 08/828,212 at page 15, line 21 through page 17, line 10, which are hereby incorporated by reference.

It is understood that combinations of such fibers or blends or copolymers formed from any of the above materials can be used as non-glass fibers in the present invention, if desired.

Preferably, the glass fiber strands 20 comprise about 1 to about 100 weight percent of layer 12 of the mat 10 on a total solids basis, and more preferably about 50 to about 100 weight percent. If present, the non-glass fibers of the first layer 12 can comprise about 1 to about 30 weight percent of the layer on a total solids basis, and preferably about 1 to about 10 weight percent. If present, the non-glass fibers of the second layer 14 can comprise about 1 to about 15 weight percent of the layer on a total solids basis, and preferably about 1 to about 10 weight percent.

Referring now to FIG. 1, the width of the mat 10 can range from about 0.6 to about 3 meters (about 24 to about 120 inches), and preferably ranges from about 1.2 to about 2.8 meters (about 48 to about 110 inches). In the embodiment of the present invention shown in FIGS. 1 and 2, the number of strands 20 along selected edges of the mat 10 is reduced in order to provide better flow of impregnating resin throughout the mat and ensure impregnation of strands 20, which in turn results in a more consistent and smoother surface in a composite incorporating the mat. More particularly, it is preferred that the mat 10 be configured such that there is a minimum of at least about 20 mm, and preferably at least about 30 mm between each longitudinal edge 34 and 36 of the mat 10 and the beginning of the strands 20 in the adjacent primary area 26. As used herein, "longitudinal edges" means the edges of the mat which generally extend along, and preferably parallel, the strands 20 in the primary areas 26 of the mat. To this end, the secondary areas are proportioned to provide this required feature. For example, if a desired overall mat width is 1 meter (about 39 inches), the secondary areas 28 of the mat 10, which extend along the opposing longitudinal edges 34 and 36 of the mat 10, would be at least about 20 mm wide, and preferably at least about 30 mm wide. The primary area 26 of the mat 10 would occupy the central portion of the mat between the secondary areas 28. In this manner, the mat 10 configuration ensures a high quality surface finish to a laminate incorporating the mat. More specifically, if the strands 20 in the mat 10 are not thoroughly impregnated by a matrix material during formation of a laminate (as will be discussed later), the presence of the unimpregnated strand will result in defects in the laminate surface. By reducing the number of strands along the longitudinal edges 34 and 36 of the mat 10 and concentrating the strands 20 within the primary area 26 of the mat 10, the strands 20 are less restricted in their lateral movement thus providing improved resin flow through layer 12 of the mat 10 and better impregnation of the strands 20 during lamination and subsequent processing of mat 10, as will be discussed later. In addition, the possibility that any of the strands 20 along the longitudinal edges 34 and 36 will not be thoroughly impregnated by a matrix material is significantly reduced because of the lower strand density in the secondary areas 28. In the embodiment where there are no strands in secondary areas 28, the possibility of having an unimpregnated strand 20 which appears as a surface defect in a laminate is nearly eliminated.

The mat 10 can be configured in a manner such that laminates incorporating the mat can be cut into smaller sections, or blanks, each of which retains the benefits of the mat configuration of the present invention. In such an arrangement, mat would be configured to include multiple primary and secondary areas. More specifically, referring to FIGS. 5 and 6, mat 310 includes several primary areas 326 and several secondary areas 328. In a manner as discussed earlier, the primary strand density of strands 320 in primary areas 326 would be between about 1.5 to about 6 strands per centimeter and the secondary strand density of the strands 320 in secondary areas 328 would be no greater than about 0.15 strands per centimeter. Secondary areas 328a and 328e along edges 334 and 336, respectively, of the mat 310 would be at least about 20 mm wide, and preferably at least about 30 mm wide, and interior secondary areas 328b, 328c and 328d would be at least about 40 mm wide, and preferably at least about 60 mm wide. In this manner, a laminate incorporating the mat 310 can be cut through the secondary areas 328b, 328c and 328d, preferably along the centerline of these areas, to form the smaller blanks each having the required secondary area width.

It should be appreciated that the widths of the primary and secondary areas do not have to be the same the across the mat. More specifically, the width of these areas may be adjusted so as to provide the desired blank size.

In addition, if desired the mat 310 can be cut into smaller mat sections through the secondary areas prior to incorporating the mat section into a laminate. The resulting mat sections would each retain the feature of the present invention.

Figure 5:
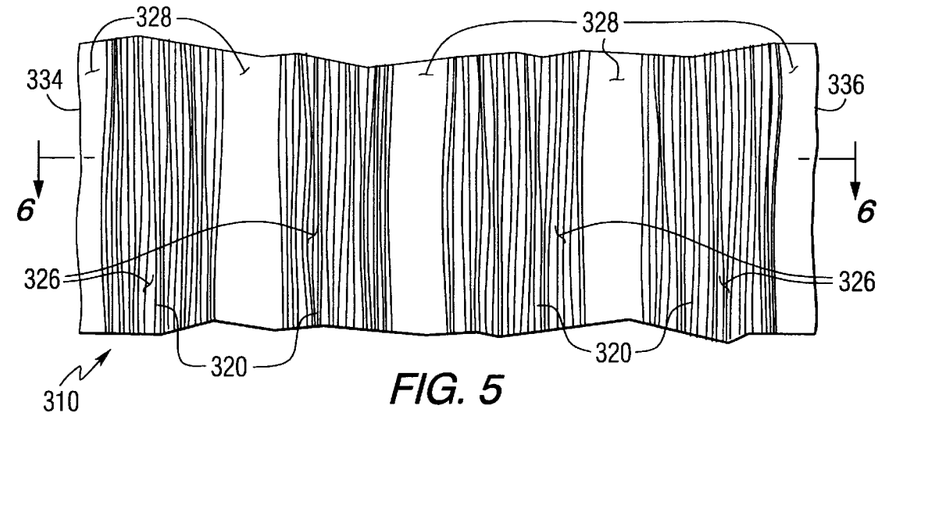
FIG. 5 is view similar to FIG. 1 of another alternative embodiment of a mat incorporating features of the present invention.
Figure 6:
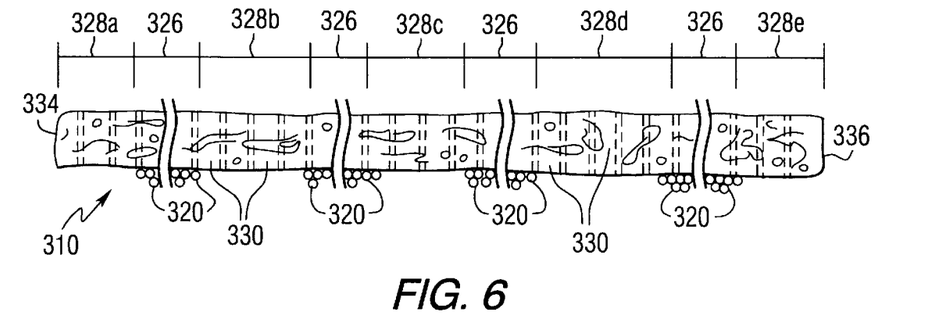
FIG. 6 is an enlarged cross sectional view of the mat of FIG. 5, taken along lines 5—5 of FIG. 5.

The mat configuration shown in FIGS. 5 and 6 eliminates the need to cut the mat through an area that contains a large number of continuous unidirectional strands. More specifically, if the strands 320 of mat 310 were spaced uniformly across the width of the mat, in order to cut smaller blanks of a desired size, the cut would sever a number of strands 320. The resulting edge of the blank would include the ends of the cut strands as well as a number of strands positioned close to the edge. The presence of these strands along the edge greatly increases the possibility that some of the strands will not be completely impregnated by the matrix material and will mar the surface of a laminate incorporating the mat. By configuring mat 310 as shown in FIGS. 5 and 6, each blank will have secondary areas along its longitudinal edges which include few, if any, strands 320 so that a high quality surface appearance in the laminate can be maintained.

The length of the mat 10 can vary based upon such factors as the desired length of the product to be transported to the customer. The mat 10 is preferably formed by a generally continuous process as discussed below. Preferably, the length of the mat 10 ranges from about 60 to about 300 meters (about 200 to about 1000 feet), and more preferably about 180 to about 275 meters (about 600 to about 900 feet).

The mats made in accordance with the present invention have a surface weight which varies from 1000 to about 1600 g/m$^2$ (about 3.28 to about 5.24 oz/in$^2$) in the primary areas, and preferably from about 1100 to about 1500 g/m$^2$ (about 3.6 to about 4.92 oz/in$^2$), and which varies from about 600 to about goo g/m$^2$ (about 1.97 to about 2.95 oz/in$^2$) in the secondary areas, and preferably from about 700 to about 850 g/m$^2$ (about 2.3 to about 2.71 oz/in$^2$). It is expected that the mats will have an overall surface weight of about 900 to 1300 g/m$^2$ (about 2.95 to about 4.26 oz/in$^2$), and preferably from about 950 to about 1250 g/m$^2$ (about 3.12 to about 4.1 oz/in$^2$) depending in part on the type of fibers, number of strands in the primary and secondary areas, and the width of the primary and secondary areas.

In order to hold the components of the mat together during fabrication and subsequent handling, the first and second layers are joined. This joining can be accomplished by a mechanical system, for example knitting, sewing, needling, or by a chemical system. Although not limiting in the present invention, it is preferred that the layers of the mat be joined by needling, as will be discussed later. Prior to needling the thickness of the mat 10 varies from about 6 to about 30 millimeters (about 0.24 to about 1.18 inch) in the primary area 26, and preferably from about 8 to about 20 millimeters (about 0.31 to about 0.79 inch), and varies from about 6 to about 25 millimeters (about 0.24 to about 0.98 inch) in the secondary area 28, and preferably from about 8 to about 15 millimeters (about 0.31 to about 0.59 inch).

Preferably, the mat 10 is not treated or coated with any adhesive or polymeric binder material to join the mat layers or promote consolidation of the mat 10, although such binders can be used in accordance with the present invention. Non-limiting examples of useful polymeric binders include polyvinyl acetate, polyesters and polypropylene. Suitable polymeric binders can be in the form of a powder, fiber or emulsion, as desired. The binders are consolidated with the mat typically by the application of heat and pressure, such as by passing the mat between heated calendering rolls.

Figure 7:
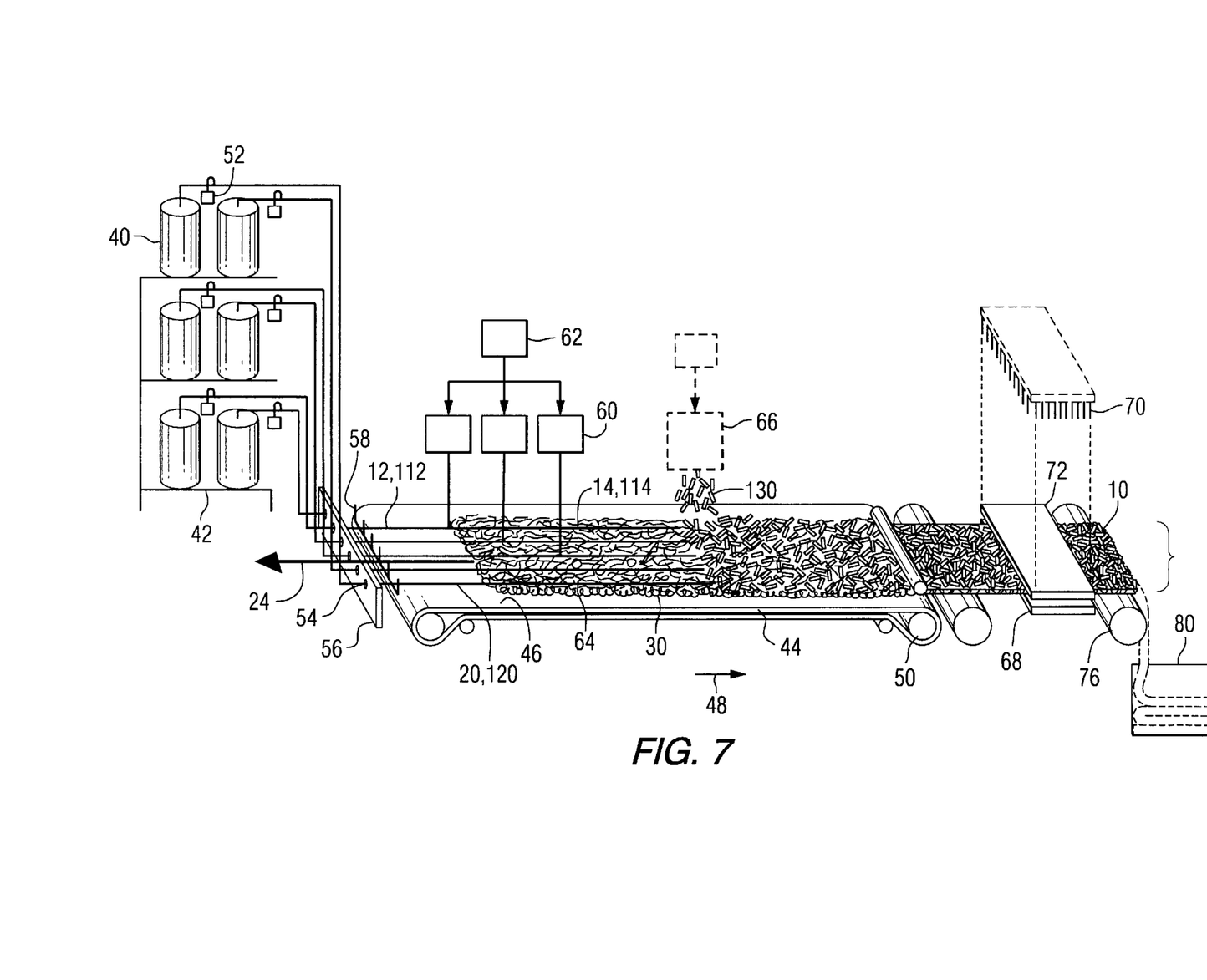
FIG. 7 is a schematic perspective view of a system for forming a mat incorporating features of the present invention, with portions removed for clarity.

The process for forming the mat 10 will now be discussed. Referring now to FIG. 7, the layer 12 can be formed, for example, by positioning a plurality of forming or supply packages 40 mounted upon a creel 42 adjacent to a conveyor 44, the surface 46 of which is driven in a direction 48 by a pair of spaced drive rollers 50 which are rotated by a motor (not shown). The surface 46 of the conveyor 44 can be generally smooth or foraminous, such as a chain mesh. Useful conveyors 44 are well known to those skilled in the art and are discussed further below.

Conventional creels suitable for use in the present invention are shown in Loewenstein at page 315, which is hereby incorporated by reference. The supply packages can be wound such that the strand 20 can be withdrawn from the inside of the supply package or from the outside of the supply package (known in the art as "filling wind"). The dimensions of the supply package can vary, depending upon such variables as the diameter and type of fiber wound thereon, and are generally determined by convenience for later handling and processing. Generally, supply packages are about 15.2 to about 76.2 centimeters (about 6 to about 30 inches) in diameter and have a length of about 12.7 to about 101.6 centimeters (about 5 to about 40 inches).

The strands 20 can be aligned generally parallel to the longitudinal axis 24 of the mat 10 by tensioning each strand with a tensioning device 52, such as a weight of about 1 ounce or less, and feeding each strand 20 through a corresponding eyelet 54 mounted in a spacer board 56. The position of the eyelet 54 corresponds to the desired position of that strand 20 within the first layer 12 of the mat 10. The aligned strands 20 are passed through a comb 58, which can be fabricated from a low abrasion material such as ceramic or stainless steel, and then deposited onto the surface 46 of the conveyor 44. The number and spacing of eyelets 54 corresponds to the number of strands 20 to be aligned in the one or more primary areas 26 and secondary areas 28 of the mat 10. More specifically, if the mat were configured as shown in FIGS. 5 and 6, the eyelets 54 would be positioned to form multiple primary and secondary areas. The diameter of each eyelet 54 is generally slightly larger than the diameter of the corresponding strand 20 passing therethrough. The eyelet 54 is preferably formed from a material which inhibits abrasion of the strand 20, such as ceramic or graphite. If desired, an antistatic agent, for example an amine, amide or quaternary salt such as soyadimethyl ethylammonium ethosulfate, can be applied to the strands 20 prior to deposition upon the conveyor 44.

In the embodiment of the invention illustrated in FIGS. 1 and 2 in which the second layer 14 comprises generally continuous glass fiber strands 30, the second layer 14 can be formed, for example, by positioning a plurality of strand feeders 60 above the conveyor 44 for depositing the second layer 14. Each strand feeder 60 is supported for reciprocating movement above the conveyor 44. The movement of each strand feeder 60 is generally transverse to the direction 48 of motion of the conveyor 44. Each strand feeder 60 receives strands 30 from a strand supply 62, described below, and feeds the strands 30 by way of an endless belt between spaced driven pulling wheels. The pulled strands 30 are fed against a deflector plate structured to deposit the strands 30 onto the conveyor 44 as a plurality of loops 64. The strand feeders 60 are continuously traversed across the width of the conveyor 44 such that the loops 64 are deposited across the predetermined width of the second layer 14 to be formed.

The generally continuous glass fiber strands 30 are randomly oriented preferably in at least two dimensions. For example and not limiting in the present invention, by depositing the glass fiber strands 30 onto the conveyor 44 in an array of interleaved layers of generally circular, elongated elliptical and/or random loops 64, each of the loops 64 has a longitudinal axis positioned generally parallel to the longitudinal axis 24 of the mat 10. Preferably the loops are generally elliptical. The diameter of the loops 64 can range from about 75 to about 610 millimeters (about 3 to about 24 inches).

By controlling the speed at which the conveyor surface 46 and/or strand feeders 60 move, the second layer 14 can be formed with the strands 30 being oriented in a predetermined pattern and the layer having a generally constant width and thickness. The speed at which the conveyor surface 46 is moved can range from about 1.5 to about 9 meters per minute (about 5 to about 30 feet per minute). The speed at which the strand feeders 60 are moved can range from about 25 to about 150 centimeters per second (about 10 to about 60 inches per second).

The number of strand feeders 60 can range from 1 to about 20, and preferably ranges from about 6 to about 20. Three strand feeders 60 are shown in FIG. 7. A non-limiting example of a strand feeder useful in the present invention is disclosed in U.S. Pat. No. 4,692,375 at column 7, line 14 through column 8, line 18, which is hereby incorporated by reference. Useful apparatus and processes for forming a mat of continuous strands are disclosed in U.S. Pat. No. 4,692,375 at column 5, line 52 through column 6, line 24, and Loewenstein at pages 309–311, which are hereby incorporated by reference.

The strands 30 can be supplied to the feeders 60 from a strand supply 62 which can be a plurality of forming or supply packages mounted upon a creel, such as are discussed above for use in forming the layer 12.

In an alternative embodiment, the strand supply 62 is a fiber forming apparatus which comprises a glass melting furnace or forehearth containing a supply of a fiber forming mass or molten glass and having a precious metal bushing or spinneret attached to the bottom of the forehearth as disclosed in U.S. Ser. No. 08/866,775 at page 28, line 16 through page 29, line 7, which is hereby incorporated by reference.

Alternatively, the fiber forming apparatus can be, for example, a forming device for non-glass fibers or strands, the methods and apparatus for which are discussed in detail above.

In the embodiment of the invention shown in FIG. 3, second layer 114 is formed from randomly oriented chopped glass fiber strands 130. Referring to FIG. 7, there is shown in phantom a chopper 66 positioned proximate the conveyor 44 from which a supply of chopped glass fiber strands 130 is dispensed onto the conveyor 44. The number of choppers will vary based on the size and configuration of the mat but typically there are about 1 to about 4 choppers. Alternatively, the strands can be chopped at a location spaced apart from and remote to the mat forming apparatus and transported to the mat forming apparatus. As discussed above, in this particular embodiment, a fabric 32 is positioned across the width of the mat 110, overlaying the strands 120 in the primary areas 126 and extending over the secondary areas 128. Although not shown in FIG. 7, a roll of the fabric 32 would be positioned at the upstream end of conveyor 44, preferably between the strand combs 58 and the choppers 66, and would unwind to continuously cover the strands 120 and conveyor 44 prior to the deposition of the chopped strand 130 on the conveyor 44. It should be appreciated that if the fabric 32 is incorporated into a mat which includes continuous strand in the second layer, the fabric roll is preferably positioned before the strand feeders 60 so as to cover the continuous strands of the first layer prior to the deposition of the strands forming the second layer.

Preferably, the chopper 66 dispenses about 2.8 to about 280 grams of strand per minute per linear millimeter width (about 30 to about 300 ounces per minute per linear foot width). The amount of chopped strand 130 per unit area incorporated into the mat is also a function of the conveyor speed.

Non-limiting examples of suitable choppers 66 include the Model 90 cutter and Model 120 extra wide cutter which are commercially available from Finn and Fram, Inc. of California. Useful apparatus and processes for forming a layer of chopped strands is disclosed in Loewenstein at pages 293–303, which are hereby incorporated by reference.

If desired, at least a portion of the chopped glass fiber strand can be opened up or filamentized, prior to forming the second layer of the mat of the present invention, by a carding machine such as are commercially available from Hollingsworth on Wheels, Inc. of Greenville, S.C. or N. Schlumberger (USA) Inc. of Charlotte, N.C. Preferably, the chopped strand is filamentized by passing the chopped strand through a filamentizing webber system, such as the MODEL B RANDO-WEB® processor system which is commercially available from Rando, Inc. of Macedon, N.Y. See "From Bale to Nonwoven Web in one Continuous Operation", a publication of Rando, Inc. (September 1990) at pages 4–5, which are hereby incorporated by reference.

The percentage of filamentized chopped strand can be adjusted by adjusting the tolerances between the mating rolls of the strand opener, the rotational speed of the rolls and conveyors and by the selection of components for the coating composition and loss on ignition of the coating composition on the glass. The filamentization can also be controlled by using different coating compositions having different adhesive properties on separate portions of the glass supply. If utilized, the percentage of filamentized chopped strand can range from about 1 to about 95 weight percent of the second layer on a total solids basis, and preferably about 10 to about 90 weight percent.

In embodiments of the invention wherein the second layer comprises both randomly oriented continuous glass strand and chopped glass strands, mats can be produced by positioning the strand feeders 60 and choppers 66 relative to each other such that continuous and chopped strands are combined or layered as they are deposited upon the conveyor 44.

With continued reference to FIG. 7, the unidirectional strands 20, 120 of the first layer 12, 112 are entangled with the continuous strands 30 and/or chopped strands 130 of the second layer 14, 114 by needling. In addition, there is some degree of entanglement within first layer 12, 112 between strands 20, 120 and within second layer 14, 114 between strands 30 and/or 130. The later is particularly apparent in the secondary areas of the mat when there are few, if any strands 20, 120. In addition, if the mat incorporates a third layer 18 such as fabric 32 is discussed above, the needling operation will further entangle the strands 20, 30, 120 and 130 in the mat with the fabric 32. The needling can be accomplished by passing the mat 10 through a needler 68, such as disclosed in U.S. Pat. No. 4,277,531 at column 3, line 37 through column 5, line 2 and U.S. Pat. No. 4,335,176 at column 3, lines 27 through 45, which are hereby incorporated by reference.

The needier 68 utilizes a plurality of spaced needles 70 to entangle or intertwine the strands 20, 30 and 130 of the mat 10, 110 to impart mechanical strength and integrity to the mat. The needles 70 are secured to a vertically reciprocating needle board 72 and are constructed and arranged with a barb which entangles the strands 20, 30 and 130 as the needles 70 pass through the mat, forming apertures 74 (shown in FIG. 2). Depending on the barb configuration of the needles 70, the entanglement can occur during either the upward or downward stroke of the needle board 72. The needle board 72 can be reciprocated such that a full stroke (downward and upward motion) occurs in a period of about 100 to about 1000 strokes per minute. Rollers 76 are provided to move the mat 10, 110 through the needler 68 during the needling operation.

A non-limiting example of a suitable needling machine is Model NL 9 which is commercially available from Textilmaschinenfabrik Dr. Ernest Fehrer AG of Austria.

The length of the needle 70, the depth of the penetration of the needle 70 through the mat during its passage through the needler 68 and the extent to which the fibers in the strands in the first and second layers entangle determine the extent to which impact strength can be imparted to a laminate incorporating the mat as reinforcement.

Preferably, the gauge of the needle 70 ranges from about 32 to about 19 gauge. If desired the needling operation can use a combination of different sized needles. The punch density is preferably about 10 to about 100 punches per square centimeter.

The punching depth or degree of penetration of the needles through the mat preferably ranges from about 7.5 to about 20 millimeters (about 0.3 to about 0.8 inches). In a typical needling process, the mat entering the needler 68 can have an overall average thickness of about 9 to about 30 millimeters. After passage throughout the needler 68, the mat can have a compressed overall average thickness of about 5 to about 20 millimeters (about 0.2 to about 0.8 inches).

After formation and needling, the mat can be rolled to form a roll (not shown) or festooned or severed into predetermined lengths and packaged in a conventional container 80 of suitable dimensions for shipment to the customer.

It should be appreciated that the mat of the present invention can be needled from both sides, i.e. its upper and lower major surfaces. However, care must be taken to avoid excessive breakage of the continuous unidirectional strands 20 in first layer 12, which in turn can result in reduced strength of a laminate incorporating the mat.

In addition, in embodiments of the invention which utilize fabric 32, the second and third layers of the mat can be preassembled prior to their incorporation into the mat. More specifically, the randomly oriented continuous fiber strands and/or chopped strands can be deposited on the fabric and joined together, preferably by needling, to form a combined layer. This layer can then be positioned by the mat forming apparatus as shown in FIG. 7 to extend over the primary and secondary areas of the mat, overlaying the unidirectional strands of the first layer. The entire assembly would then pass through the needler to entangle the strands of the mat as discussed above.

Figure 8:
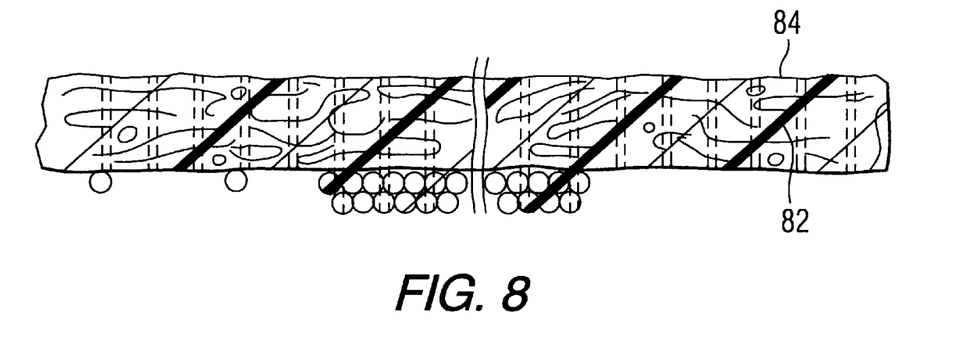
FIGS. 8 and 9 are enlarged schematic cross sectional views of laminates incorporating features of the present invention.

The mat 10 can be used to reinforce a thermoplastic matrix material 82 to form a polymeric laminate 84 as shown in FIG. 8, which is subsequently formed into a rigid, shaped composite using methods discussed herein and well known in the art. Non-limiting examples of suitable polymeric thermoplastic materials include polyolefins, polyamides, polyurethanes, polyesters, acrylic polymers, vinyl polymers, derivatives and mixtures thereof, as disclosed in U.S. Ser. No. 08/828,212 at page 25, line 21 through page 27, line 17, which is hereby incorporated by reference.

Other components which can be included with the thermoplastic matrix material 82 and mat 10 in the laminate 84 are, for example, colorants or pigments, lubricants or process aids, ultraviolet light (UV) stabilizers, antioxidants, other fillers, and extenders.

Figure 9:
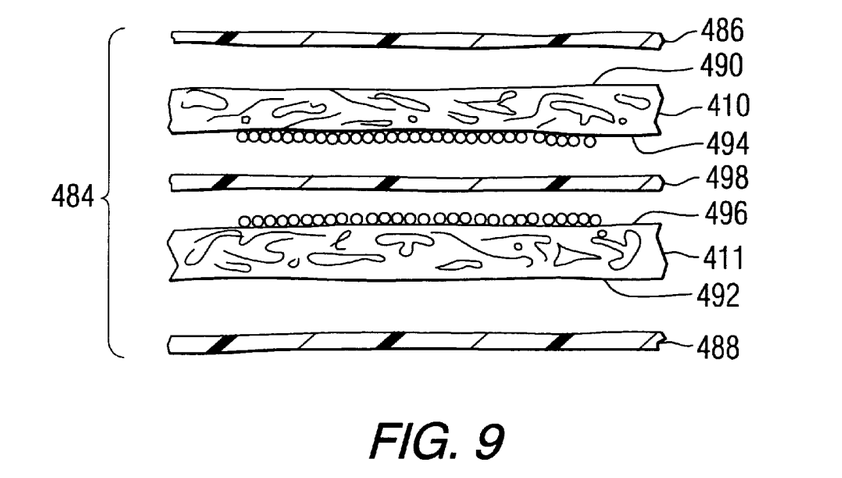

The thermoplastic matrix material 82 and mat 10 can be formed into laminate 84 and subsequently shaped into a composite by a variety of methods which depend, in part, on the type of thermoplastic matrix material 82 used. For example and without limiting the present invention, to form the laminate, the opposing major surfaces of a mat can be coated with the thermoplastic matrix material 82, heated to a temperature sufficient to melt the matrix material and pressed between a set of rollers. The rollers force the matrix material into the mat to ensure thorough impregnation of the mat strands and also establishes the desired laminate thickness. The resulting structure is then cooled to ambient temperature to provide a reinforced thermoplastic laminate. One or more laminates can then be stacked and reheated to a temperature above the softening temperature of the laminate and then shaped to the final desired configuration by any well know shaping operation, such as but not limited to, compression molding or stamping. Referring to FIG. 9, in one particular embodiment of the invention, the laminate 484 includes two mats 410 and 411 made according to Example 2 below, that are positioned such that the unidirectional strands in the first layer of each mat are aligned in the same direction and face inward as shown in FIG. 9. However, it should be appreciated that the mats can be positioned such that the unidirectional strands faced outward, or in the alternative, such that one layer of unidirectional strands is positioned between the mats and the other layer of unidirectional strands is on the outer surface of the laminate. The matrix material is applied to the mats in the form of a liquid resin 486 and 488 along the opposing outer surfaces 490 and 492 of the stacked mats and a third liquid resin 498 is applied between facing surfaces 494 and 496 of mats 410 and 411, respectively. The liquid resin can be applied in any convenient manner, for example, extrusion along the mat surfaces. The laminate is then passed between a set of heated rollers to press the assembly and ensure thorough impregnation of the mat strands with the matrix material. As an alternative, the matrix material can be applied to one or all of the mat surfaces in the form of a resin sheet. The mat and resin can then be heated in an oven to a temperature and for a sufficient time to melt the matrix material before pressing the assembly between a set of rollers. The resulting laminate is then cooled to ambient temperature between a set of cooled rollers. Thereafter, the laminates can be heated and formed into a shaped composite. In the embodiment of the invention wherein the mat is configured as shown in FIGS. 5 and 6 with multiple primary and secondary areas, after forming a laminate incorporating the mat, the laminate is cut through the secondary areas of the mat to produce predetermined blank sizes while maintaining a minimum distance between the unidirectional strand and the longitudinal edge of the blank of at least 20 mm, and preferably about 30 mm. As an alternative, the mat can be cut to the desired blank size prior to the lamination process. One skilled in the art would understand that the laminating and molding temperatures and pressure can vary based upon such factors as the dimensions and structure of the composite to be formed and the thermoplastic matrix material. Useful apparatuses and methods for forming laminates are disclosed in U.S. Pat. No. 4,277,531 at column 5, line 31 through column 6, line 4 and U.S. Pat. No. 4,335,176 at column 4, lines 2 through 44, which are hereby incorporated by reference.

If desired, the mats of the present invention can also be used to reinforce a thermoplastic matrix material to form a composite, by other methods known in the art, for example by vacuum molding, open lay-up molding using resin and glass fiber spray-up equipment, preforms for press molding, sheet molding and dough molding, pultrusion, filament winding and panel formation processes.

The coating compositions and matrix materials discussed above have all been directed toward making a thermoplastic laminate and composite. However, it should be appreciated that the mat discussed herein can also be used in combination with thermosetting compatible coating compositions and thermosetting matrices. Non-limiting examples of such thermosetting compatible coating compositions and thermosetting matrices are discloses in U.S. Ser. No. 08/866,775 at page 13, line 7 through page 19, line 3, and page 34, line 26 through page 35, line 18, which is hereby incorporated by reference.

A method according to the present invention for making a mat adapted to reinforce a polymeric matrix material, preferably a thermoplastic matrix material, will now be described generally.

With reference to FIG. 7, the method generally comprises the initial step of positioning a plurality of generally parallel, essentially continuous glass fiber strands 20 generally parallel to a longitudinal axis 24 of the mat 10 to form a first layer 12. The strands 20 are positioned within primary areas 26 and secondary areas 28 of the mat 10 at the desired primary and secondary strands densities, respectively. At least a portion of the outer surfaces of the strands 20 have applied thereon at least a partial layer comprising at least a partially dried residue of a sizing composition which is compatible with the thermoplastic matrix material, discussed in detail above.

In one embodiment, a plurality of essentially continuous glass fiber strands 30 are dispersed over the primary and secondary areas of the mat to form a second layer 14. In the method as shown in FIG. 7 and as discussed above, the second layer 14 overlays the first layer 12. The glass fiber strands 30 of the second layer 14 are randomly oriented and preferably dispersed by one or more strand feeders 60 in a manner such as is discussed in detail above. At least a portion of the outer surfaces of the strands 30 have applied thereon at least a partial layer comprising at least a partially dried residue of a sizing composition which is compatible with the thermoplastic matrix material, discussed in detail above.

Alternatively or additionally, a plurality of chopped glass fiber strands 130 form or are incorporated into the second layer of the mat. The chopped strands having an average length such as is discussed above. At least a portion of the outer surfaces of the chopped strands 130 have applied thereon at least a partial layer comprising at least a partially dried residue of a sizing composition which is compatible with the thermoplastic matrix material, discussed in detail above. If desired, a fabric 32 can be incorporated into the mat, extending across the entire width of the mat and positioned preferably between the first and second layers of the mat. The chopped strands 130 can be dispersed onto the fabric 32 from a chopper 66 in a manner such as is discussed in detail above.

The unidirectional glass fiber strands 20 are entangled with the glass fiber strands 30 (and chopped strands 130 and/or fabric 32, if present) by needling to form the mat 10. Suitable needlers and the methods for needling are discussed in detail above.

In the method as shown in FIG. 7 and discussed above, the second layer overlays the first layer. As an alternative, the mat can also be made by depositing continuous fiber strands and/or chopped fiber strands directly on the conveyor 44 to form the second layer and thereafter positioning the unidirectional continuous strands over the second layer strands to form the first layer. Fabric 32, if included, would be positioned over second layer strands prior to incorporating the first layer strands into the mat.

A method according to the present invention for reinforcing a polymeric matrix material, preferably a thermoplastic matrix material, to form a reinforced laminate will now be described generally. The method comprises the initial step of positioning a plurality of generally parallel, essentially continuous glass fiber strands 20 generally parallel to a longitudinal axis 24 of the mat 10 to form a first layer 12, as discussed above. The strands 20 are positioned within primary areas 26 and secondary areas 28 of the mat 10 at the desired primary and secondary strands densities, respectively. A plurality of essentially continuous and/or chopped glass fiber strands 30, 130 are dispersed over the primary and secondary areas of the mat, overlaying the first layer 12, to form a second layer 14. Strands 30, 130 are randomly oriented as discussed above. At least a portion of the outer surfaces of the strands 20, 30 and 130 have applied thereon at least a partial layer comprising at least a partially dried residue of a sizing composition which is compatible with the thermoplastic matrix material, discussed in detail above. Methods and apparatus for forming and needling the mat 10 are discussed in detail above.

At least a portion of the mat 10 is coated and impregnated with the thermoplastic matrix material. The thermoplastic matrix material is heated to a temperature sufficient to melt the matrix material and processed in a manner that ensures that the matrix material thoroughly impregnates the mat strands, for example, by passing the mat coated with the matrix material between a pair of roller, as discussed above. The resulting structure is then cooled to ambient temperature to provide a reinforced thermoplastic laminate, as discussed above.

The present invention will now be illustrated by the following specific, non-limiting examples.

EXAMPLE 1

A first aqueous sizing composition given in Table 1 was prepared and applied to essentially continuous, E-glass fibers having an approximate fiber diameter of 23 microns (designated "T" fiber) as they were attenuated from a fiber forming apparatus. About 1800 of these fibers were gathered together to form a single strand having a tex of 1985 which was subsequently wound on to a tube to form a package. Packages thus formed were dried in an oven at about 130° C. (266° F.) for about 13 hours. The amount of size on the surface of the dried fiber strands was approximately 0.45 weight percent as measured by loss on ignition.

TABLE 1

| Component | Weight of Component per unit of aqueous sizing composition grams (pounds) |
|---|---|
| gamma-glycidoxypropyltrimethoxysilane[1] | 2313.3 (5.10) |
| acetic acid[2] | 104.3 (0.23) |
| tetraethylene pentamine[3] | 4581.3 (10.10) |

TABLE 1-continued

| Component | Weight of Component per unit of aqueous sizing composition grams (pounds) |
|---|---|
| polypropylene emulsion[4] | 94649.1 (208.6) |
| maleic acid[5] | 5411.3 (11.93) |
| epoxy resin dispersion[6] | 10,514.2 (23.18) |
| water | sufficient to make 100 gallons |

[1]A-187 which is commercially available from OSi Specialties, Inc. of Danbury, Connecticut.
[2]Glacial Acetic Acid which is commercially available from Fisher Scientific of Pittsburgh, Pennsylvania.
[3]Alubraspin 230 which is commercially available from PPG Industries, Inc. of Pittsburgh, Pennsylvania.
[4]Protolube RL-5440 which is commercially available from National Starch and Chemical Company of Bridgewater, New Jersey.
[5]Maleic Acid which is commercially available from Fisher Scientific of Pittsburgh, Pennsylvania.
[6]EPI-REZ 5520-W-60 which is commercially available from Shell Chemical Company of Houston, Texas.

A second sizing composition given in Table 2 was prepared and applied to approximately 800 essentially continuous, E-glass fibers having an approximate fiber diameter of 16 microns (designated "M" fiber) as they were attenuated from a fiber forming apparatus. The approximately 800 essentially continuous, E-glass fibers were divided or split to form 4 strands each having about 200 fibers and a tex of about 72. These 4 strands were then gathered together to form a single strand having a tex of about 430 and wound onto a tube to form a package. Packages thus formed were dried in an oven at about 130° C. for about 13 hours. The amount of the size on the surface of the dried fibers was approximately 0.6 weight percent as measured by loss on ignition.

TABLE 2

| Component | Weight of Component per unit of aqueous sizing composition grams (pounds) |
|---|---|
| gamma-glycidoxypropyltrimethoxysilane | 980.2 (2.161) |
| acetic acid | 44.0 (0.097) |
| tetraethylene pentamine | 1943.6 (4.285) |
| polypropylene emulsion | 40,097.3 (88.4) |
| maleic acid | 2290.6 (5.05) |
| epoxy resin dispersion | 4458.8 (9.83) |
| water | sufficient to make 100 gallons |

A mat as shown in FIGS. 5 and 6 for reinforcing thermoplastic matrix materials was then formed from the aforementioned fibers. The mat had an overall width of about 1365 millimeters and was configured include 4 primary areas and 5 secondary areas that were alternated across the width of the mat. The 4 primary areas each had a width of about 220 millimeters, the 2 secondary areas adjacent the longitudinal edges of the mat each had a width of about 92.5 millimeters, and the remaining 3 secondary areas each had a width of about 100 millimeters.

Approximately 400, 1985 tex, essentially continuous "T" fiber strands having the sizing composition given in Table 1 were feed onto a conveyor belt through eyelets and a comb to orient the strands in generally parallel alignment to one another in the machine direction to form the first layer of the mat These unidirectional strands were positioned across the transverse direction (or width) of the conveyor belt to form the 4 primary areas, each having a primary strand density of approximately 4.5 strands per centimeter, and the 5 secondary areas, each having a secondary strand density of 0 strands per centimeter.

Approximately 39, 430 tex, essentially continuous "M" fiber strands having the sizing composition given in Table 2 were randomly deposited onto the primary and secondary areas of the mat to form the second layer. The randomly oriented continuous strands were deposited by 13 strand feeders, each strand feeder dispensing approximately 3 strands.

The mat components were then needled together from the top side of the mat using a needle board containing about 27 rows of 25 gauge, closed barb needles. The needle penetration depth was about 13.5 millimeters. Needling was conducted at a conveyor speed of about 5.18 meters per minute using a needier stroke rate of about 820 strokes per minute to produce a mat having an average punch density of about 27.1 punches per square centimeter.

The overall surface weight of the mat was about 1213 grams per square meter, with an average surface weight of the mat in the primary areas of about 1533 grams per square meter and an average surface weight in the secondary areas of about 631 grams per square meter. The mat had an average thickness of about 10 millimeters in the primary areas.

EXAMPLE 2

A first aqueous sizing composition given in Table 1 of Example 1 was prepared and applied to essentially continuous, E-glass fibers having an approximate fiber diameter of 23 microns (designated "T" fiber) as they were attenuated from a fiber forming apparatus. About 1800 of these fibers were gathered together to form a single strand having a tex of 1985 which was subsequently wound on to a tube to form a package. Packages thus formed were dried in an oven at about 130° C. for about 13 hours. The amount of size on the surface of the dried fiber strands was approximately 0.45 weight percent as measured by loss on ignition.

A second sizing composition given in Table 3 (below) was prepared and applied to essentially continuous, E-glass fibers having an approximate fiber diameter of 16 microns (designated "M" fiber) as they were attenuated from a fiber forming apparatus. About 800 of these fibers were gathered together to form a single strand having a tex of about 400 which was subsequently wound onto a tube to form a package. Packages thus formed were dried in an oven at about 130° C. for about 13 hours. Six of these strands were then gathered together in a roving operation to form a single strand having a tex of about 2400. The rovings were subsequently chopped to form chopped strands having an average length of about 2.54 centimeters (about 1 inch). The amount of the size on the surface of the dried fibers was approximately 0.65 weight percent as measured by loss on ignition.

TABLE 3

| Component | Weight of Component per unit of aqueous sizing composition grams (pounds) |
| --- | --- |
| gamma-aminopropyltriethoxysilane[7] | 5885.7 (12.98) |
| homopolymer polyvinylacetate emulsion[8] | 10503.4 (23.16) |

TABLE 3-continued

| Component | Weight of Component per unit of aqueous sizing composition grams (pounds) |
| --- | --- |
| non-ionic modified polypropylene emulsion[9] | 23656.3 (52.15) |
| demineralized water | sufficient to make 100 gallons |

[7]AMEO which is commercially available from Sivento GmbH, GERMANY
[8]Vinamul 8837 which is commercially available from Vinamul B.V., The Netherlands
[9]Aquacer-1051 which is commercially available from Bykcera B.V. The Netherlands A mat for reinforcing thermoplastic materials was then formed from the aforementioned fibers. This mat was configured in a manner similar to that shown in FIGS. 5 and 6; however the second layer of the mat was formed from randomly oriented chopped fiber strands as shown in FIG. 3 and discussed above. More specifically, the mat had an overall width of about 1365 millimeters and was configured include 4 primary areas and 5 secondary areas that were alternated across the width of the mat. The 2 primary areas adjacent the longitudinal edges of the mat each had a width of about 210 millimeters and the remaining 2 primary areas each had a width of about 230 millimeters. The 2 secondary areas adjacent the longitudinal edges of the mat each had a width of about 122.5 millimeters and the remaining 3 secondary areas each had a width of about 80 millimeters.

Approximately 252, 1985 tex, essentially continuous, "T" fiber strands having the sizing composition given in Table 1 of Example 1 were feed on to a conveyor belt through eyelets and a comb to orient the strands in generally parallel alignment to one another in the machine direction to form the first layer of the mat. These unidirectional strands were positioned across the transverse direction (or width) of the conveyor belt to form the 4 primary regions, each having a primary strand density of approximately 2.9 strands per centimeter and the 5 secondary regions, each having a secondary strand density of 0 strands per centimeter.

Prior to forming the second layer of the mat, a spunbond polypropylene nonwoven fabric (or veil) having a surface weight of about 34 grams per square meter and commercially available from Fiberweb North America, Inc. of Simpsonville, S.C. was incorporated into the mat, with the fabric extending over the primary and secondary areas and overlaying the unidirectional strands of the first layer of the mat.

The chopped "M" fiber strand rovings described above were then randomly deposited onto the polypropylene veil throughout the primary and secondary areas.

The mat components were then needled together using a needle board containing 23 rows of closed barb needles, the first 7 rows of which contained 32 gauge needles and the remaining 16 rows of which contained 25 gauge needles. The penetration depth of the needles was about 13.5 millimeters. Needling was conducted at a conveyor speed of about 2 meters per minute using a needler stroke rate of about 250 strokes per minute to produce a mat having an average needle punch density of about 28 punches per square centimeter.

The overall surface weight of the mat was about 1100 grams per square meter. The average surface weight of the mat in the 2 primary areas adjacent the longitudinal edges of the mat was about 1310 grams per square meter and the average surface weight of remaining 2 primary areas was about 1360 grams per square meter. The average surface weight in the secondary areas was about 734 grams per square meter. The mat had an overall thickness of about 8.5 millimeters in the primary areas.

EXAMPLE 3

Two thermoplastic composite automotive wheel wells were fabricated according to the procedures detailed below in order to compare the visual quality of the laminates. One of the composites ("Example A") was fabricated using the mat described in detail above in Example 2 and the other composite ("Comparative Example") was fabricated using a needled mat commercially available from PPG Industries Fiber Glass B.V., Hoogezand, The Netherlands (designated "9795, 1035 gram per square meter, unidirectional mat") having a first layer of unidirectional strands with a strand density of about 2.9 strands per centimeter across the entire width of the mat, a second layer of randomly oriented continuous strands, and an average surface weight of about 1035 grams per square meter.

Laminates were made from each of the two types of mats as follows. For the laminates in Example A, two mats of the kind described above in Example 2 were coated with liquid resins containing about 90% polypropylene. The mats were oriented such that the unidirectional strands of the first layer of each mat were aligned with each other and faced inward as shown in FIG. 9. The first layer of each of the mats (i.e. the inwardly facing surfaces) was coated with BOREALIS HL520J which is commercially available from Ashland Chemical Co. of Dublin, Ohio and the second layer of each of the mats (i.e. the outwardly facing surfaces) was coated with BOREALIS HM520J (also available from Ashland Chemical Co.). The coated mats were subsequently laminated together. The laminate for Example A contained about 38 weight percent glass on a total solids basis.

For the laminates in the Comparative Example, two commercially available needled mat of the kind described above were coated with liquid resins containing about 90% polypropylene. The mats were oriented such that the unidirectional strands of the first layer of each mat were aligned with each other and faced outward. The first layer of each of the mats (i.e. the outwardly facing surfaces) was coated with BOREALIS HM520J and the second layer of each of the mats (i.e. the inwardly facing surfaces) was coated with BOREALIS HL520J. The coated mats were subsequently laminated together. The laminate for the Comparative Example contained about 38 weight percent glass on a total solids basis.

The laminates were prepared using a Sandvik laminator which is commercially available from Sandvik Germany. The laminates were formed at a temperature of about 230° C. (446° F.) using a pressure of about 500,000 Pascals applied for about 2.5 minutes.

Thermoplastic composites Example A and Comparative Example were then fabricated from the respective laminates described above as follows. To form composite Example A, two laminates as described above having a combined total weight of about 4.94 Kg were trimmed, preheated in an oven at a temperature of about 210° C. (410° F.) for about 600 seconds, stacked in a mold having a temperature of about 60° C. (140° F.) and molded in a Diffenbacher or Krupp molding apparatus (commercially available from Diffenbacher or Krupp Germany) using a pressure of about 30,000 kiloPascals applied for about 50 seconds. To form composite Comparative Example, nine laminates as described above having a combined total weight of about 6.02 Kg were trimmed, preheated, stacked and molded as discussed above for Example A. The final dimensions of the molded part were about 1080 millimeters by about 800 millimeters by about 300 millimeters deep.

Each molded part was visually inspected for unimpregnated fibers and surface quality. The results of these evaluations are set forth in Table 4.

TABLE 4

| Visual Inspection Criterion | Example A | Comparative Example |
| --- | --- | --- |
| Unimpregnated, Visible Fibers at Edge | None | Many |
| Surface Quality | Acceptable | Unacceptable |

As used above, "unacceptable" means that the part could not be sold and would have to be scraped.

It should be appreciated that the Comparative Example required more laminates than Example A because, as discussed above, the mats of the present invention provide better flow of the polymeric matrix materials. More specifically, it was found that this particular part required only 2 laminates incorporating the mats of the present invention to fill and flow within the mold and produce Example A while the Comparative Example required 9 laminates incorporating the other mat discussed above to fill and flow within the mold. As a result, not only is the final part lighter but assembly and fabrication times, as well as their associated costs, should be less for Example A because of the reduced number of laminates that must be produced and subsequently processed and incorporated into the molded part.

In addition to providing high surface quality to laminates and composites formed with the mats of the present invention, other advantages of the mats include high level of impregnation to provide good load bearing capabilities and interlaminar shear strength, good cross directional uniformity, good fiber flow homogeneity during mat compaction during molding, low delamination, high reinforcement weight capacity, and good flow. The mats of the present invention also have sufficient structural integrity to resist damage during transportation and handling and are useful in a wide variety of molding processes. In addition, the mats of the present invention exhibit improved formability and good structural integrity which facilitates handling of the mat and enables the fabricator to decrease mold cycle times and potentially reduce the weight of the composite part.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A mat having at least one primary area and at least one secondary area and adapted to reinforce a polymeric matrix material, the mat comprising:
   (a) a first layer comprising a plurality of generally parallel, essentially continuous glass fiber strands oriented generally parallel to a longitudinal axis of the mat, at least a portion of outer surfaces of the first layer glass fiber strands having applied thereon at least a partial layer comprising at least a partially dried residue of first coating composition which is compatible with a polymeric matrix material, wherein at least a first portion of the first layer glass fiber strands are positioned within the at least one primary area at a primary strand density and at least a second portion of the first layer glass fiber strands are positioned within the at least one secondary area at a secondary strand density which is different from the primary strand density; and (b) a second layer comprising a plurality of randomly oriented glass fiber strands positioned within the at least one primary area and the at least one secondary area and adjacent to a surface of the first layer, at least a portion of outer surfaces of the second layer glass fiber strands having applied thereon at least a partial layer comprising at least a partially dried residue of a second coating composition which is compatible with the polymeric matrix material, wherein the first and second layers are joined to hold the mat together.

2. The mat according to claim 1, wherein the second layer comprises a plurality of randomly oriented essentially continuous glass fibers strands.

3. The mat according to claim 1, wherein the second layer comprises a plurality of randomly oriented chopped glass fiber strands having an average length ranging from about 10 to about 150 millimeters.

4. The mat according to claim 1, wherein the second layer comprises a plurality of randomly oriented essentially continuous glass fibers strands and a plurality of randomly oriented chopped glass fiber strands having an average length ranging from about 10 to about 150 millimeters.

5. The mat according to claim 1, wherein the polymeric matrix material is a thermoplastic matrix material and the first and second coating compositions are compatible with the thermoplastic matrix material.

6. The mat according to claim 1, wherein the polymeric matrix material is a thermosetting matrix material and the first and second coating compositions are compatible with the thermosetting matrix material.

7. The mat according to claim 1, wherein the at least one secondary area has a width of at least about 20 millimeters.

8. The mat according to claim 7, wherein the at least one secondary area has a width of at least about 30 millimeters.

9. The mat according to claim 1, wherein the first strand density is between about 1.5 to about 6 strands per centimeter and the second strand density is no greater than about 0.15 strands per centimeter.

10. The mat as in claim 9, wherein the first strand density is between about 2 to about 4 strands per centimeter and the second strand density is no greater than about 0.05 strands per centimeter.

11. The mat as in claim 9, wherein the second strand density is 0 strands per centimeter.

12. The mat according to claim 1, wherein the surface weight of the mat ranges from about 900 to about 1300 grams per square meter.

13. The mat according to claim 12, wherein the surface weight of the mat ranges from about 950 to about 1250 grams per square meter.

14. The mat according to claim 12, wherein the surface weight of the at least one primary area of the mat ranges from about 1000 to about 1600 grams per square meter and the surface weight of the at least one secondary area of the mat ranges from about 600 to about 900 grams per square meter.

15. The mat according to claim 14, wherein the surface weight of the at least one primary area of the mat ranges from about 1100 to about 1500 grams per square meter and the surface weight of the at least one secondary area of the mat ranges from about 700 to about 850 grams per square meter.

16. The mat according to claim 1, wherein the first layer and second layer are needled together at a punch density ranging from about 10 to about 100 punches per square centimeter.

17. The mat according to claim 1, further comprising a fabric positioned between the first and second layers, the fabric being compatible with the polymeric matrix material.

18. The mat as in claim 17 wherein at least a portion of both the first layer glass fiber strands and the second layer glass fiber strands are entangled with at least a portion of the fabric by needling.

19. The mat according to claim 1, wherein the mat further comprises a plurality of non-glass fibers.

20. The mat according to claim 1, wherein the at least one secondary area comprises a first secondary areas positioned along a longitudinal edge of the mat and a second secondary area positioned along an opposing longitudinal area of the mat, and the at least one primary area comprises one primary area positioned between the first and second secondary areas.

21. The mat according to claim 1, wherein the at least one primary area comprises multiple primary areas and the at least one secondary area comprises multiple secondary areas.

22. The mat according to claim 21, wherein the multiple primary areas alternate with the multiple secondary areas across the mat.

23. The mat according to claim 1, wherein a portion of the second layer glass fiber strands are entangled with themselves and with a portion of the first layer glass fiber strands by needling to join the first and second layers.

24. The mat according to claim 1, wherein the at least one secondary area has a width of at least about 20 millimeters, the first strand density is between about 1.5 to about 6 strands per centimeter, the second strand density is no greater than about 0.15 strands per centimeter, the surface weight of the mat ranges from about 900 to about 1300 grams per square meter, with the surface weight of the at least one primary area of the mat ranging from about 1000 to about 1600 grams per square meter and the surface weight of the at least one secondary area of the mat ranging from about 600 to about 900 grams per square meter, and a portion of the second layer glass fiber strands are entangled with themselves and with a portion of the first layer glass fiber strands by needling to join the first and second layers.

25. A reinforced polymeric laminate comprising:

(a) a polymeric matrix material; and (b) a reinforcing mat having at least one primary and at least one secondary area comprising:

(1) a first layer comprising a plurality of generally parallel, essentially continuous glass fiber strands oriented generally parallel to a longitudinal axis of the mat, at least a portion of outer surfaces of the first layer glass fiber strands having applied thereon at least a partial layer comprising at least a partially dried residue of a first coating composition which is compatible with a polymeric matrix material, wherein at least a first portion of the first layer glass fiber strands are positioned within the at least one primary area at a primary strand density and at least a second portion of the first layer glass fiber strands are positioned within the at least one secondary area at a secondary strand density which is different from the primary strand density; and (2) a second layer comprising a plurality of randomly oriented glass fiber strands positioned within the at least one primary area and the at least one secondary area and adjacent to a surface of the first layer, at least a portion of outer surfaces of the second layer glass fiber strands having applied thereon at least a partial layer comprising at least a partially dried residue of a second coating composition which is compatible with the polymeric matrix material, wherein the first and second layers are joined to hold the mat together.

26. A reinforced composite comprising at least one reinforced polymeric laminate comprising:
   (a) a polymeric matrix material; and
   (b) a reinforcing mat having at least one primary and at least one secondary area comprising:
      (1) a first layer comprising a plurality of generally parallel, essentially continuous glass fiber strands oriented generally parallel to a longitudinal axis of the mat, at least a portion of outer surfaces of the first layer glass fiber strands having applied thereon at least a partial layer comprising at least a partially dried residue of a first coating composition which is compatible with a polymeric matrix material, wherein at least a first portion of the first layer glass fiber strands are positioned within the at least one primary area at a primary strand density and at least a second portion of the first layer glass fiber strands are positioned within the at least one secondary area at a secondary strand density which is different from the primary strand density; and
      (2) a second layer comprising a plurality of randomly oriented glass fiber strands positioned within the at least one primary area and the at least one secondary area and adjacent to a surface of the first layer, at least a portion of outer surfaces of the second layer glass fiber strands having applied thereon at least a partial layer comprising at least a partially dried residue of a second coating composition which is compatible with the polymeric matrix material, wherein the first and second layers are joined to hold the mat together.

* * * * *